Figure 1:
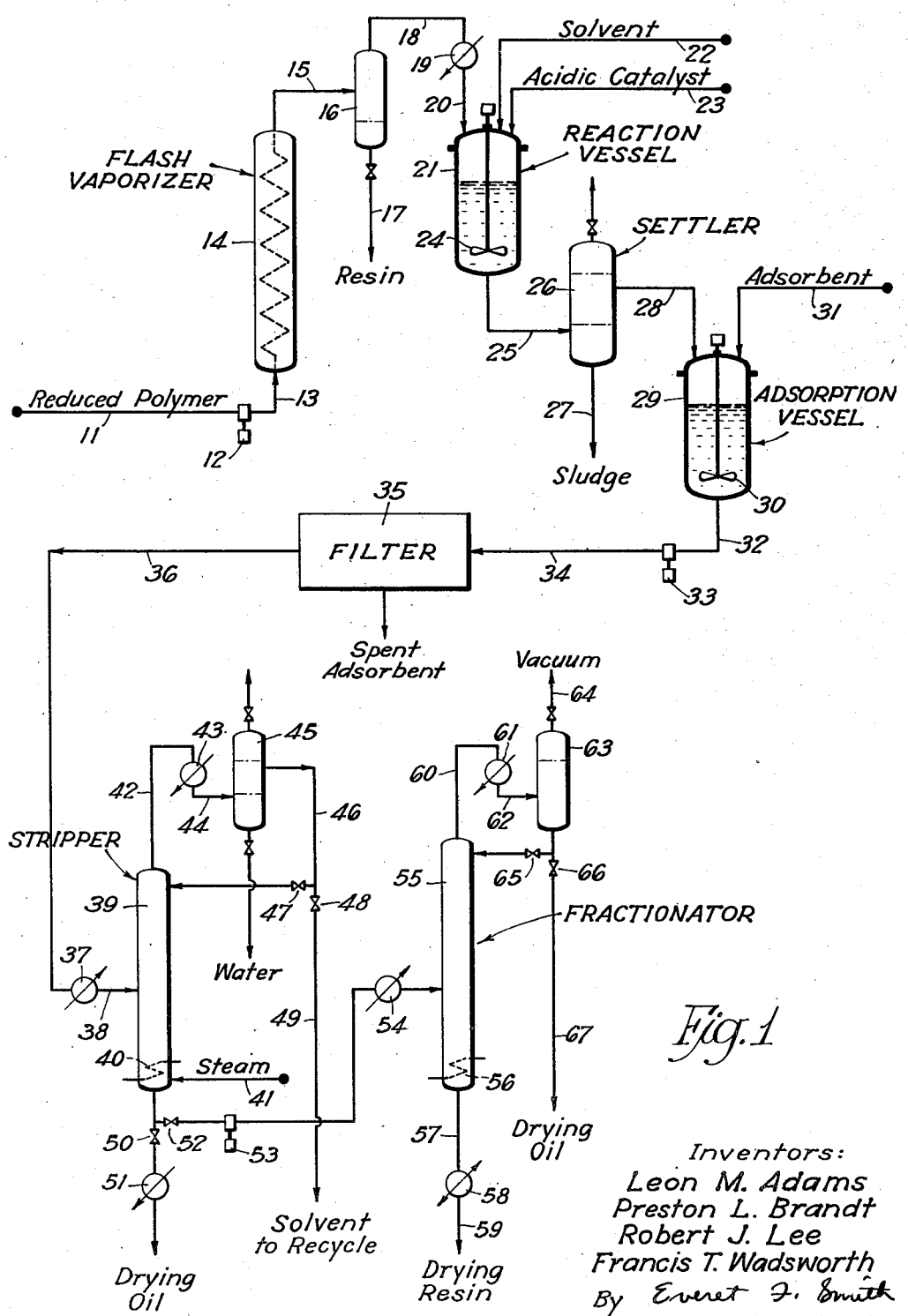

Inventors:
Leon M. Adams
Preston L. Brandt
Robert J. Lee
Francis T. Wadsworth
By Everet J. Smith
Patent Agent Inventors:
Leon M. Adams
Preston L. Brandt
Robert J. Lee
Francis T. Wadsworth
By Everet F. Smith
Patent Agent Patented Oct. 2, 1951

2,569,595

UNITED STATES PATENT OFFICE 2,569,595

PREPARATION OF DRYING OILS FROM CLAY POLYMERS

Leon M. Adams, Texas City, Preston L. Brandt, Galveston, Robert J. Lee, La Marque, and Francis T. Wadsworth, Dickinson, Tex., assignors to Pan-American Refining Corporation, Texas City, Tex., a corporation of Delaware Application November 8, 1947, Serial No. 784,814

1 Claim. (Cl. 196—78)

This invention relates to polymeric materials, commonly called "clay polymers," prepared by contacting cracked petroleum distillates at elevated temperatures in the vapor phase with active solid catalysts, and more particularly to a method for preparing drying oils having improved color from such polymers.

Our invention broadly comprises contacting the said polymers or fractions thereof with a selective catalyst of a type more fully described below, whereby the color bodies in said polymers are selectively converted into an immiscible sludge; and the treated polymer is subsequently further purified by contacting it in the liquid phase with an adsorbent solid. A valuable drying oil of greatly improved color is produced by these operations.

The primary object of our invention is to prepare synthetic hydrocarbon drying oils of good color from clay polymer, a material which is at present of limited utility because of its dark color and heterogeneous composition. Another object of our invention is to devise continuous means for separating color bodies from clay polymer. A further object of our invention is to lower the quantity of adsorbent material required for the decolorization of clay polymer. A subsidiary object of our invention is to prepare new and improved surface-coating compositions comprising clay polymer drying oils. Other objects and advantages of our invention over the prior art will be apparent from the description and examples.

In the cracking of petroleum hydrocarbons, various gum-forming materials are produced, and must be removed in order to give a product of satisfactory stability. This may be done in a variety of ways, one of the most satisfactory of which is the Gray process (USP 1,340,889, May 25, 1920). In this process, cracked hydrocarbons are passed in the vapor phase through a bed of an active solid, such as fuller's earth, at an elevated temperature, for example, above about 400° F. Under these conditions, the gum and color bodies are polymerized and a highly unsaturated polymer is produced on the clay. In a typical clay-treating installation, cracked gasoline vapors are passed through a tower containing a false bottom to support the clay charge. Such a tower having a 12-foot inside diameter and a height of 19.5 feet may contain 25 tons of 30–60 mesh clay, suitably a 50:50 mixture of Floridin clay and fuller's earth. The tower may be operated according to a cyclic procedure, in which it is taken off stream periodically and the polymer is washed from the clay with a suitable solvent, such as gasoline, kerosene, light naphthas, aliphatic ethers, aromatic hydrocarbons, and the like. Preferably, however, the temperature and pressure within the clay tower are adjusted so that a partial condensation of heavier components of the gasoline vapors takes place therein. Under these conditions, the polymer tends to flow downward out of the clay, and the condensed hydrocarbons act as solvents to assist in the removal of the polymer from the clay. This technique makes continuous operation of the tower feasible, and moreover it prolongs the activity of the clay at a high level. Under the most suitable conditions, the polymeric product is recovered as a 20 percent concentrate in the condensed hydrocarbons. The polymer may subsequently be isolated by stripping off the solvent, preferably under vacuum, with or without the use of steam or an inert gas.

Among the numerous catalysts suitable for producing clay polymer may be mentioned bone black, charcoal, activated carbon, bauxite, silica gel, magnesium silicate, kieselguhr, infusorial earth, diatomaceous earth, and various clays, such as fuller's earth and bentonite, which contain primarily aluminum silicates. As specific examples of such clays may be mentioned Florida earths, known by various names such as Floridin and Florex, and Attapulgus clay. The latter may advantageously be prepared as described in U. S. Patent 2,363,876.

The polymers resulting from the Gray process in general have low volatility, high viscosity, and good drying properties, the latter resulting from their high iodine numbers, generally above about 150. Unfortunately, however, the polymers are very dark in color, and for this reason, despite their good drying properties, they have not been utilized to any substantial extent as components of surface-coating materials.

Numerous attempts to improve the color of clay polymers have been made during the twenty-seven years that have elapsed since Gray first prepared them, but little success has been achieved. It has been observed, for example, that clay-treating the polymer in the liquid phase will give a product of light-red color. However, the life of the clay in this process is extremely low, of the order of 1 to 2 barrels (42 gallons per barrel) of polymer per ton of clay, and for this reason the process is not economically feasible.

We have now discovered that under properly chosen conditions certain catalysts are capable of selectively degrading and sludging the greater proportion of the color bodies in clay polymers, without affecting the desirable drying constituents thereof to any objectionable extent. This is highly unexpected, in view of the prior art, which teaches the polymerization and removal of diolefinic (drying) constituents from petroleum fractions by treatment with acidic materials, such as sulfuric acid; and particularly in view of Osterstrom USP 2,067,334, which teaches the conversion of cracked-gasoline polymers into lubricating oils by treatment with sulfuric acid, probably through intermolecular hydrogen transfer, as disclosed by Ipatieff and Pines (J. Org. Chem., 1, 464 (1936)). The latter mechanism has also been applied, for example by Thomas in USP 2,240,081, to convert olefinic polymers into much more highly unsaturated materials. We have now observed that acidic catalysts in general, as hereinafter defined, attack first the color bodies in clay polymer, which appear ordinarily to constitute up to around 15 percent by weight of the total polymer, and we have discovered that the color bodies may be removed preferentially, leaving a drying oil of good color and drying properties, if the polymer is contacted with an acidic catalyst under conditions such that the reduction of the iodine number of the polymer is not greater than around 30 percent of the original value, and preferably under conditions such that the iodine number is reduced between about 5 and 20 percent below its original value. On the basis of this discovery, we have devised an improved and highly advantageous process for decolorizing clay polymers and for preparing superior drying oils therefrom. The process is carried out broadly as follows:

The clay polymer or a fraction thereof may be dissolved in a substantially unreactive solvent, if necessary, to reduce its viscosity to a suitable level. The polymer or polymer fraction, or solution thereof is then contacted with the selective polymerization catalyst, whereby the color bodies are converted into a sludge, which is then separated. The purified polymer solution is subsequently contacted with an active clay or other adsorbent solid, for example a material of the type used in the Gray process, to remove any remaining dissolved and/or suspended polymeric residues; and after the solution has been separated from the clay, the solvent is stripped off, leaving a purified polymer of amber to light-red color suitable for use in surface-coating compositions.

In a typical application of the Gray process, cracked gasoline vapors are passed through a bed of 30 to 60 mesh Attapulgus or Floridin clay, comprising aluminum silicates, at a temperature of 425–450° F., a pressure of 200–300 pounds per square inch, gage, and a space velocity around 5 barrels per ton per hour. Under these conditions, polymerization of color and gum-forming components of the gasoline takes place and a highly unsaturated polymer is produced. The crude clay polymer emerging from the reaction unit is in a diluted form containing 80 to 85 percent of gasoline and kerosene boiling range material, which is stripped out, for example, with steam to give so-called "reduced" clay polymers, the properties of which vary, depending on the extent to which the low-boiling constituents are removed. The following are the properties of two typical reduced clay polymers:

|  | A | B |
| --- | --- | --- |
| Non-volatiles, per cent by weight | 55–60 | 89–93 |
| Viscosity at 100° F., SSU [1] | 300–350 |  |
| Viscosity at 210° F., SSU [1] |  | 300–400 |
| Color, 1% in hexane, ASTM [2] | 8+ | 8+ |
| Color, 0.5% in hexane | 6.5 | 7.5 |
| Color, 0.3% in hexane |  | 4.5 |
| Iodine number [3] | 190–230 | 200–250 |
| Specific gravity | 0.967 | 0.999 |
| Average molecular weight [4] |  | 385–390 |

[1] Saybolt Universal Seconds (ASTM D-68-38).
[2] D155-39T.
[3] Wijs, 0.5 hr., 200% excess.
[4] Menzie's method.

Drying oils of somewhat improved color may be separated from clay polymers by means of fractional distillation. For example, when polymer B (described above) is fractionated at 5–10 mm. Hg in a batch still, a drying oil of appreciably lighter color may be obtained by separately collecting the 10–50% fraction withdrawn overhead, based on the quantity of polymer charged to the still. Alternatively and preferably, the clay polymer may be subjected to a flash distillation, either under vacuum or around atmospheric pressure, whereby the material is heated rapidly to a high temperature, suitably 500 to 1200° F., for a very short period of time, optionally with the addition of an inert gas as a stripping agent, and the drying-oil constituents are vaporized and separated from the heavier ends without the losses that ordinarily occur in the slower batch-type distillation of unsaturated compounds. By this means, we have succeeded in separating from reduced clay polymer an overhead fraction comprising up to around 90 percent of the original material, and of a dark green color, rather than the original opaque black. We have observed, however, that the distillates obtained by any of these methods retain an objectionable amount of color and odor, and tend to darken on aging; and by means of our improved process we have now succeeded in effecting a stable and greatly superior decolorization of clay polymers and clay polymer distillates.

In carrying out our process, the clay polymer or a drying-oil fraction thereof is preferably first dissolved in a solvent that is substantially unreactive under the processing conditions subsequently employed. Saturated aliphatic and naphthenic hydrocarbons and their halogenated derivatives in general, and mixtures thereof, are suitable. For example, we may use pentanes, hexanes, heptanes, octanes, nonanes, decanes, and the like; or cyclopentane, methylcyclopentane, cyclohexane, and the like; or chloroform, carbon tetrachloride, propyl bromide, and other unreactive halogenated solvents; and by operating under suitable conditions of pressure, we may use lower-boiling members of the groups designated above, such as propane, butane, cyclopropane, dichlorotetrafluoroethane, and the like. We have observed that ordinarily about one-fourth to four volumes of solvent per volume of clay polymer are ample to reduce the viscosity to a suitable level, and we prefer to use between about one and two volumes per volume. Higher proportions of solvent may be used, for example, as much as 10:1 or more; however, at the higher proportions, the expense of recovering the solvent is increased without any material compensating advantage in carrying out the process.

The clay polymer solution is then contacted with a catalyst capable of polymerizing the colored constituents thereof without degrading an excessive proportion of the desired drying-oil components. For this purpose, polymerization catalysts of the acid type are suitable, such as boron fluoride, sulfuric acid, aluminum chloride, hydrogen fluoride, mixtures of hydrogen fluoride with boron fluoride, sulfonic acids, phosphoric acids, stannic chloride, spent isomerization catalysts comprising complexes of aluminum chloride and hydrocarbons, and the like. All of these materials are either strong mineral acids, or give such acids on hydrolysis. We ordinarily use between about 0.5 and 20 percent of the catalyst, based on the weight of clay polymer, and we prefer to use between about 5 and 15 percent.

The primary action of the defined class of catalysts is to convert the color bodies in the clay polymer into a sludge, but they tend secondarily to attack the drying components of the clay polymer if their action is unnecessarily prolonged. For this reason, the temperature and the time of contact between the catalyst and polymer solution should be adjusted so that any reduction in iodine number that may occur is limited to an amount not greater than around 30 percent of the original value, in order to effect a maximum degree of color improvement without serious impairment of the drying properties of the resulting oil. Ordinarily, we choose to operate at such temperatures and contact times that the decolorization operation can be completed without lowering the iodine number of the oil more than about 5 to 20 percent below its original value, and preferably not more than 10 percent. The optimum temperature during the polymerization reaction varies inversely as a function of the contact time for a given catalyst, and ranges ordinarily between about −40 and +300° F. With boron fluoride, for example, we prefer to operate in the lower part of this range, suitably between about −40 and +100° F.; with sulfuric acid, in the middle part, suitably between about 30 and 200° F.; and with phosphoric acids, in the upper part, suitably between about 100 and 300° F. The contact time between the catalyst and the polymer solution varies according to the specific catalyst, the temperature employed, the type of mixing equipment, and the desired degree of color improvement. In general, however, we have found that 0.5 to 10 minutes of contacting in continuous orifice-mixers is sufficient, whereas in less efficiently agitated batch-type equipment the time of treating may be considerably longer, for example up to ten hours or more.

The pressure within the reaction vessel is not a critical reaction variable. However, the pressure should preferably be kept at such a level as will maintain a sufficient quantity of solvent in the liquid phase to give a solution having the desired properties.

The acidic polymerization catalyst converts the color bodies into a sludge, which settles out and may be withdrawn when the reaction mixture is allowed to stand, or which may be separated by other convenient means, such as centrifugation. The polymer solution remaining is then treated in the liquid phase with an active adsorbent solid, such as the materials suitable for use in the production of clay polymers by the Gray process, the residual sludge and a portion of the residual color being removed thereby. In carrying out this treatment, the polymer solution may, for example, be percolated through a column packed with granulated adsorbent, or the solution may be slurried with the adsorbent in finely divided form, and subsequently filtered or centrifuged. The conditions employed in this treatment are not critical. Temperatures within the range of about 30 to 150° F. are entirely satisfactory, and space velocities in the percolation method up to about 50 barrels of polymer per ton of clay per hour are operative.

Ordinarily, the clay treatment, as described above, will completely remove all entrained or dissolved acidic materials from the polymer solution. However, alkaline materials, such as sodium carbonate or the like, may be incorporated with the adsorbent to assist in such removal; or the polymer solution may be contacted with such alkaline materials or aqueous solutions thereof, either before or after the adsorbent treatment.

Finally, the solvent is stripped out of the treated polymer solution in a conventional atmospheric or vacuum still, with or without the use of steam or an inert gas as a stripping agent. A product of superior color is thereby isolated.

In carrying out our invention, we may choose to employ fractional distillation of the polymer at one or more stages of the process. For example, we may use a clay polymer charging stock in the form of a liquid having a viscosity (prior to the addition of solvent) of 300–400 Saybolt universal seconds at 100° F.; or we may prefer to strip out lower-boiling components from the polymer to give a charging stock having a viscosity of 300–500 seconds at 210° F., or higher; or we may choose to vacuum fractionate the polymer to isolate a distillate fraction having an improved color and a higher iodine number; or we may choose to flash-distill the crude clay polymer to isolate a fraction of improved color in substantially greater yield, as described more fully above. The last two alternatives, in particular, in combination with the process of our invention, permit the production of drying oils of light color and excellent drying properties. At the end of our process, after the clay treatment and the separation of the solvent, we may choose to distill the treated polymer under vacuum as a final purification step, giving a product of lighter color.

In the combination process outlined above, we have observed that one ton of adsorbent material consistently produces around 12 to 15 or more barrels (42 gallons per barrel) of refined drying oil having an ASTM color of 4 or less in 2 percent hexane solution, prior to vacuum distillation. The adsorbent material may afterwards be regenerated by washing it with an eluant comprising a lower aliphatic alcohol and/or a lower aliphatic ketone, mixed with a light aromatic or naphthenic hydrocarbon. For this purpose, a solution of methanol in benzene is preferred. The exhausted adsorbent material is thereby washed comparatively free from adsorbed polymers, and is subsequently dried with an inert gas or with superheated steam. It is then ready for reuse, with substantially the same activity as it possessed initially. The wash liquid may be evaporated in a suitable still to recover the solvents used, and the polymeric residue in the still may then be recovered for use as a binder for carbon electrodes, cores, wood, sand, cork, and asbestos articles, and the like.

In a preferred form of our invention, we employ sulfuric acid as the selective polymerization catalyst, suitably aqueous sulfuric acid having a concentration above 70 percent, or fuming sulfuric acid containing up to 20 percent or more of free sulfur trioxide. Ordinarily, however, we choose to employ aqueous sulfuric acid having a concentration between about 90 and 100 percent, and we prefer to contact the clay polymer solution with the sulfuric acid for a period between about 5 and 20 minutes at a temperature between about 30 and 200° F. The ratio of catalyst to polymer is preferably around 20 pounds of acid per barrel of clay polymer distillate, and around 40 pounds per barrel of reduced clay polymer. In the subsequent treatment with active adsorbent solid, we have processed up to 100 barrels of acid-treated reduced clay polymer per ton of solid, and up to 200 barrels of acid-treated clay polymer distillate per ton of solid, before regeneration of the solid was necessary. By means of this process, we have converted clay polymer distillates in yields around 90 percent to drying oils which, without dilution, have ASTM colors below 5, and which set to touch in one to three hours and tack-free in five to ten hours after addition of conventional driers (0.3% Pb and 0.06% Mn, in the form of the naphthenates).

Figure 1 illustrates an embodiment of our invention employing flash distillation of the crude clay polymer solution, followed by treatment of the distillate with a strong inorganic acid.

Reduced clay polymer, similar to polymer B hereinbefore described, flows through line 11 into pump 12 and is transferred through line 13 into flash vaporizer 14. Around 90 percent of the crude polymer solution is vaporized therein, and emerges through line 15 into separator 16, where the resinous, non-vaporized material is separated and withdrawn through line 17. The vapors pass through line 18 into cooler 19, from which the condensate flows through line 20 into reaction vessel 21, of which two or more may be provided and used in succession, in order to permit continuous operation of the distillation equipment.

In reaction vessel 21, an equal volume of an inert solvent, such as naphtha, is added through line 22, and 10 percent by weight of 98 percent sulfuric acid, based on the weight of polymer, is introduced through line 23. The mixture is then stirred thoroughly by agitator 24 for a total average residence time of approximately 25 to 30 minutes at 70 to 120° F.

From reaction vessel 21, the treated material is withdrawn through line 25 into settling tank 26, where the sludge is allowed to separate. The sludge layer is withdrawn from settling tank 26 through line 27, and may be accumulated for subsequent recovery of valuable chemicals contained therein.

The treated polymer solution from settler 26 flows through line 28 into adsorption vessel 29, of which two or more may be provided and used alternately. Therein, the solution is agitated by stirrer 30 and contacted with an adsorbent solid, such as fuller's earth, introduced through port 31. The resulting slurry emerges from the bottom of vessel 29 through line 32 and is forced by pump 33 through line 34 into filter 35, where the spent adsorbent is separated. The filter cake is withdrawn, revivified, and recycled; and the filtrate flows through line 36, heater 37, and line 38 into stripper column 39 at an intermediate point.

In column 39, the solvent is stripped out of the polymer solution by means of reboiler 40 and by means of steam introduced through line 41. Solvent and water vapors emerge overhead through line 42 into cooler 43, from which the condensate flows through line 44 into separator 45. The solvent layer in separator 45 is withdrawn through line 46 and is split into two streams, one of which is refluxed to stripper 39 through valve 47, and the other is withdrawn through valve 48 and recycled through line 49, suitably to reaction vessel 21, and preferably after being dried.

The bottom stream from stripper 39 is a purified drying oil, and may be withdrawn through valve 50 and cooler 51. Alternatively, the bottom stream may be transferred, for further purification, through valve 52, pump 53, and heater 54 to an intermediate zone of fractionator 55, equipped with reboiler 56. Therein, the material is subjected to fractional distillation under a vacuum below about 25 mm. Hg. A drying-resin fraction is withdrawn from the bottom of fractionator 55 through line 57, heat exchanger 58, and line 59. The major portion of the charge stream emerges overhead as a vapor through line 60 into cooler 61, and the resulting condensate flows through line 62 into separator 63, which is connected through line 64 to a vacuum source. A portion of the condensate is refluxed to fractionator 55 through valve 65, and the remainder is withdrawn through valve 66 and line 67 as the primary drying-oil product.

Figure 2:
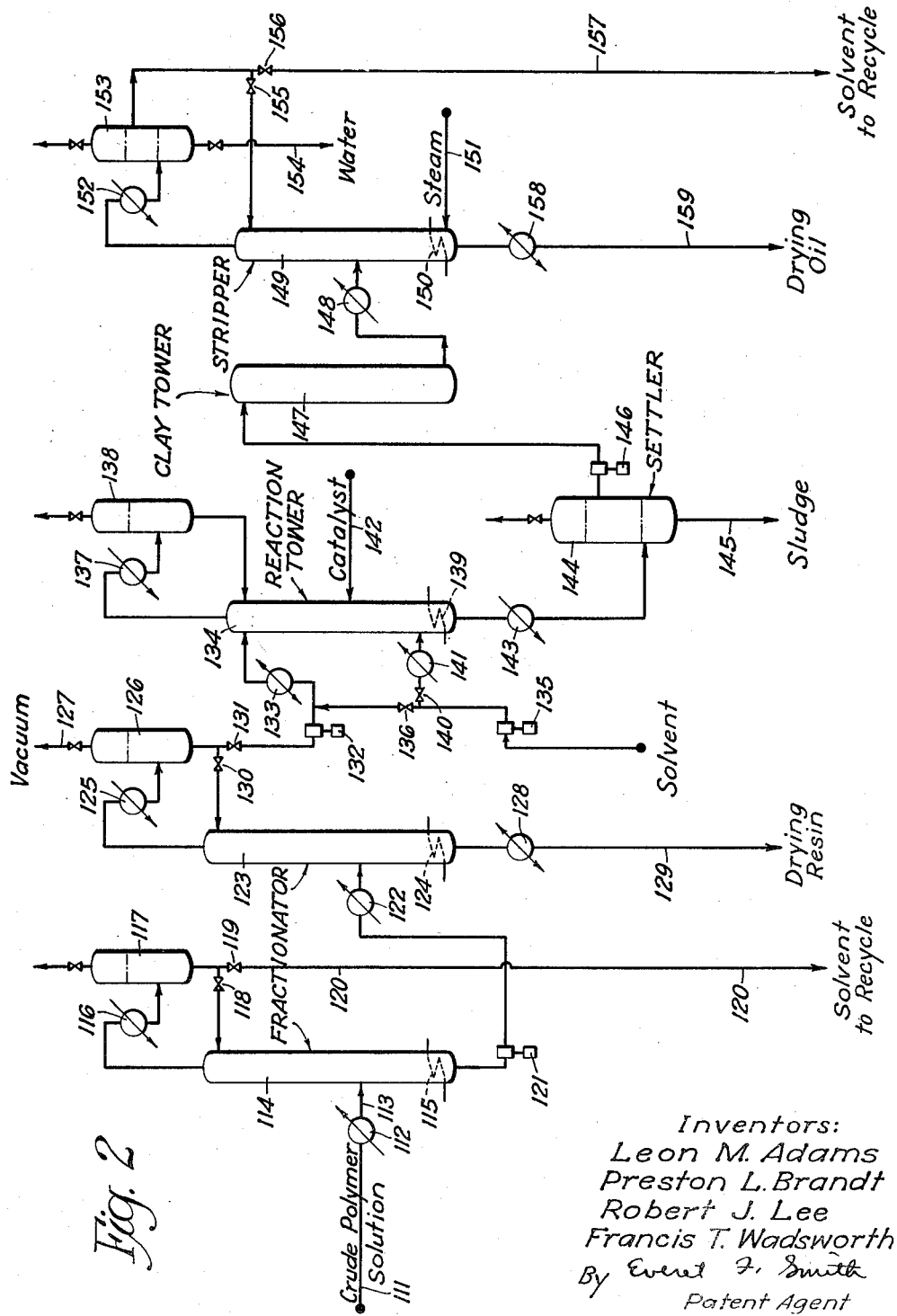

In another highly advantageous embodiment of our invention, the clay polymer is contacted countercurrently with a gasiform acidic polymerization catalyst, such as boron fluoride, preferably under conditions of temperature, pressure, contact time, and catalyst-to-polymer ratio that the ensuing reduction in iodine number of the polymer is not greater than about 10 percent. Such a process is illustrated in Figure 2, wherein the apparatus comprises fractionating towers to separate a drying-oil distillate fraction from the crude clay polymer, a continuous reactor for contacting the distillate fraction with the gasiform acidic polymerization catalyst, a semi-continuous tower for subsequently clay-treating the distillate fraction, and a continuous stripper column.

Crude clay polymer solution from the Gray towers is fed through line 111, heater 112, and line 113 to an intermediate point of fractionator column 114, equipped with reboiler 115, condenser 116, and separator 117. Substantially all of the naphtha boiling up to about 600° F. is stripped out of the solution entering column 114, and is liquefied in condenser 116, from which it flows into separator 117 and is split into two streams. One naphtha stream is refluxed through valve 118 to column 114, and the other is taken off through valve 119 and line 120, and is recycled, for example, to the clay-extraction stage of the process in which the clay polymer is made.

The bottoms from column 114, a polymer having a viscosity of 200–1000 SSU at 210° F., are transferred by pump 121 through heater 122 into vacuum still 123, equipped with reboiler 124, condenser 125, separator 126, and a vacuum-producing means applied to separator 126 through line 127. A portion of the charging stock, for example around 15–50 percent, is withdrawn at the bottom through heat exchanger 128 and line 129. This material is a highly colored drying resin having a softening point of 150–300° F., as determined by the ring-and-ball test. The major portion of the charging stock emerges overhead through condenser 125 and separator 126, and is split into two streams, one of which is refluxed to the column through valve 130, and the other is taken off through valve 131 and transferred by pump 132 through heat exchanger 133 into the top of reaction tower 134. En route to heat exchanger 133, the polymer is diluted with a solvent, such as hexane, isobutane, or propane, supplied via pump 135 and valve 136, ordinarily in the ratio of between one and two volumes of solvent per volume of polymer, and the temperature of the mixture is adjusted to the desired level in heat exchanger 133.

The mixture of clay polymer and solvent entering the upper portion of tower 134 flows downward countercurrent to a rising vapor stream of solvent and an acidic catalyst, such as boron fluoride, contact between the two streams being promoted by a suitable packing within the column. Any of these vapors which are not absorbed by the descending fresh feed mixture are condensed by cooler 137 and returned to the top of the column through reflux drum 138. The boron fluoride selectively polymerizes the color bodies in the clay polymer during the passage of the mixture downward through the column. At the bottom of the column, heat is supplied by means of a coil 139, and solvent may be supplied through valve 140, vaporized in heater 141, and introduced into the lower part of the tower to strip boron fluoride from the bottoms. The stripped boron fluoride passes upward through the column to be reabsorbed by fresh polymer. Make-up boron fluoride is supplied to the column through line 142 to compensate for losses from the system. The treated polymer solution passes from the bottom of the tower through cooler 143 into settler 144, from which a sludge layer is withdrawn through line 145.

The treated solution from settler 144 may be caustic-washed to remove traces of acid catalyst (apparatus not shown), and is then transferred by pump 146 into the top of treating tower 147, and is allowed to flow downward through a bed of adsorbent, suitably 30–60 mesh Florex clay, a typical fuller's earth. From the bottom of the column, the solution passes through heater 148 into stripper still 149 at an intermediate point. The solvent is stripped out by reboiler 150 and by steam, introduced through line 151 into the bottom of the column. Steam and solvent vapors emerge overhead and are condensed in cooler 152, from which the condensate flows into separator 153. The water layer from separator 153 is withdrawn through line 154, and is discarded or recycled, as desired. The solvent layer is divided into two streams, one of which is refluxed to stripper 149 through valve 155, and the other is withdrawn through valve 156 and recycled through line 157, suitably to pump 135, preferably after being dried.

A drying oil of good color emerges from the bottom of stripper 149 through heat exchanger 158 and line 159.

Our invention will be more fully understood from the following specific examples:

*Example I*

One volume of reduced clay polymer having a viscosity of 365 SSU at 210° F., an ASTM color of 7½ in 0.5% solution in hexane, and an iodine number of 216 was diluted with 2 volumes of pentane, and the solution was agitated with 12 percent sulfuric acid (40 pounds of acid per barrel of reduced clay polymer) at a temperature of 85–105° F. for 10 minutes. The organic layer was decanted from the sludge and filtered through Florex to a clay life of around 50 barrels per ton. On removal of the pentane, a product having an ASTM color, undiluted, of 7 was recovered in about 70 percent yield. This product was distilled under a pressure of 1.5–2 mm. Hg until 51 percent of the material had been taken off overhead. The distillate had an ASTM color of 2, and dried readily. Properties of this material were as follows:

| | |
|---|---|
| Iodine number | 183 |
| Specific gravity, 60/60° F. | 0.9375 |
| Refractive index, 25° C. | 1.5191 |

The bottoms from this distillation were a drying resin having an iodine number of 194, a ring and ball softening point of 154° F., and an ASTM color of 8 in 5 percent benzene solution.

*Example II*

Total crude clay polymer was flash distilled at atmospheric pressure with steam stripping. The total distillate was subsequently redistilled, and from it was separated a 5–6 percent heavy distillate fraction having the following properties:

| | |
|---|---|
| ASTM color, 10% solution | 8+ |
| 5% solution (green) | 5 |
| Iodine number | 215 |
| Water content, percent by volume | 2 |
| Sp. gr., 60/60° F. | 0.9738 |
| Viscosity, 100° F., SSU | 1029 |
| Viscosity, 210° F., SSU | 51 |

Boiling range:

| Per cent | °F. at 10 mm. Hg. |
|---|---|
| 5 | 198 |
| 10 | 241 |
| 15 | 342 |
| 20 | 379 |
| 30 | 433 |
| 40 | 464 |
| 50 | 484 |
| 60 | 529 |
| 70 | 543 |
| 80 | 568 |

The distillate fraction was diluted with an equal volume of light naphtha and agitated for about 5 minutes with ten pounds of 98% sulfuric acid per barrel. Virtually all of the water was removed from the distillate fraction in the resulting acid sludge.

The dried distillate solution was then agitated for 30 minutes at 85–105° F. with 30 pounds of 98 percent sulfuric acid per barrel of distillate. The resulting sludge layer was removed, and the acid-treated polymer solution was percolated through 30–60 mesh Florex to a clay life of 60–70 barrels per ton. The naphtha was subsequently stripped out, and a product having the following properties was obtained:

| | |
|---|---|
| Iodine number | 191–199 |
| ASTM color | 5 |
| Viscosity, 100° F., SSU | 688 |
| Viscosity, 210° F., SSU | 56 |
| Viscosity index | −54 |
| Sp. gr., 60/60° F. | 0.9652 |
| Non-volatiles, percent | 83 |
| Pour point, °F. | 5 |
| Flash point, °F. | 232 |
| Fire point, °F. | 258 |
| Molecular weight | 316 |
| Refractive index, 25° C. | 1.5382 |
| Specific dispersion | 165 |

*Example III*

A reduced clay polymer having a viscosity of 365 SSU at 210° F. was fractionated in a batch still at 10–25 mm. Hg, and the 5–50% overhead fraction, having a dark greenish-black color (2½ ASTM in 10% solution in hexane), an iodine number of 206, and a viscosity of 203 SSU at 100° F., was separated for use as the charging stock in the preparation of an improved drying oil. The 5–50% fraction was dissolved in an equal volume of n-pentane and agitated for 10 minutes at 95° F. with 6% by weight of 98% sulfuric acid, based on the weight of the polymer fraction. The resulting sludge layer was allowed to settle, and was separated. The pentane solution was then passed at the rate of 4 barrels (42 gallons per barrel) of polymer fraction per ton of clay per hour through a column packed with 30–60 mesh Florex clay, and finally the treated solution was stripped free of pentane with a hydrocarbon gas at 175° F., giving a purified drying oil in 91% yield, based on the weight of polymer fraction charged. The Florex clay life was 90.1 barrels of polymer fraction per ton. The purified drying oil had an ASTM color (undiluted) of 3½+, an iodine number of 189, a refractive index ($n_D^{25}$) of 1.5365, and a viscosity of 194 SSU at 100° F.

*Example IV*

A clay polymer distillate (5-50% fraction of Example III) having an iodine number of 206 and a diluted ASTM color of 2½ (10% solution in hexane) was diluted with an equal volume of pentane and treated with 20 pounds of 96% sulfuric acid per barrel for 10 minutes at 95° F. The sludge layer was separated and the treated pentane solution was percolated downward through a column filled with 30-60 mesh Florex clay which had been activated by heat treatment at 1250° F. for a period of 24 hours. The effluent from the column was collected in six fractions in order to determine the effect of clay age on color. After the pentane had been stripped out of the treated fractions, products having the following properties were obtained:

| Fraction No. | Clay Age, bbl./ton | ASTM Color |
|---|---|---|
| 1 | 0-50 | 2 |
| 2 | 50-100 | 2.5 |
| 3 | 100-150 | 2.5 |
| 4 | 150-200 | 2.5 |
| 5 | 200-250 | 3 |
| 6 | 250-300 | 3 |

*Example V*

An opaque black reduced clay polymer having a viscosity of 300-350 SSU at 210° F. viscosity was pumped into a flash distillation apparatus comprising a ¾-inch iron pipe, 24 inches long, terminating in a heated 2-inch T, which served as a separation chamber. The temperature of the pipe was maintained at 700° F. by means of a tubular combustion-type furnace, and the pressure within the separator was maintained at 10 mm. Hg. Under these conditions, the vapor phase within the separator was taken off at 550° F. and condensed, and a minor proportion of resinous, non-volatile material was withdrawn from the bottom of the separator. The overhead and residual fractions had the following properties:

|  | Overhead | Residue |
|---|---|---|
| Color | Dark green-black | Black |
| Iodine number | 217 | 214 |
| Specific gravity, 60/60° F | 0.9753 | |
| Refractive index, 25° C | 1.5500 | |
| Viscosity, 25° C., centipoises | 1290 | |
| Yield, weight per cent | 68.2 | 31.8 |
| Softening point, ° F | | 204 |

The overhead fraction was diluted with an equal volume of naphtha, and the diluted material was agitated for 10 minutes at 95° F. with 20 pounds of 96 percent sulfuric acid per barrel of overhead fraction. After separation of the resulting acid sludge, the naphtha solution was treated with 30-60 mesh Florex clay to a clay life of 50-100 barrels of overhead fraction per ton. Subsequently, the naphtha was stripped out of the solution with gas at a temperature around 212° F., and a drying oil was obtained having an ASTM color of 4, undiluted. When the oil was combined with driers (0.3% Pb and 0.06% Mn), it set to touch in about one hour.

*Example VI*

The same opaque black reduced clay polymer described in Example V was flash-distilled at a furnace temperature of 810° F., a separator pressure of 100 mm. Hg, and a vapor temperature of 610° F. in the apparatus described in Example V, and an overhead fraction was separated in a yield of 85.9% of the weight of the original charge. The properties of the overhead and residual fractions were as follows:

|  | Overhead | Residue |
|---|---|---|
| Color | Dark green-black | Black |
| Iodine number | 224 | 200 |
| Specific gravity, 60/60° F | 0.9737 | |
| Refractive index, 25° C | 1.5525 | |
| Viscosity, 25° C., centipoises | 884 | |
| Yield, weight per cent | 85.9 | 14.1 |
| Softening point, ° F | | 186 |

The overhead fraction, when decolorized as in Example V, had an ASTM color of 4.5, undiluted, and the decolorized material plus driers set to touch in one hour.

*Example VII*

A group of experiments was carried out on a reduced clay polymer having an ASTM color of 7½ in 0.5% hexane solution, an iodine number of 193, and a viscosity of 346 SSU at 100° F. The reduced clay polymer was diluted 1:1 with hexane, and a stream of $BF_3$ was bubbled through the solution under the conditions indicated below. Subsequently, the solution was washed with aqueous caustic solution, and was then filtered through Attapulgus clay. A substantial improvement in color was obtained, and the losses in iodine numbers were very low, averaging less than 10% of the original value. The process conditions and results were as follows:

| Experiment No. | 1 | 2 | 3 | 4 | 5 |
|---|---|---|---|---|---|
| $BF_3$ treatment: | | | | | |
| Temperature, ° F | -5 | 95 | 95 | 95 | 140 |
| Contact time, min | 180 | 20 | 60 | 180 | 60 |
| Clay treatment: | | | | | |
| Temperature, ° F | 77 | 77 | 77 | 77 | 77 |
| Contact time, min | 30 | 30 | 30 | 30 | 30 |
| Product color:[1] | | | | | |
| Initial effluent | 2.0 | 2.5 | 2.5 | 2.5 | 2.75 |
| Final [2] | 3.0 | 4.5 | 4.0 | 4.0 | 4.75 |
| Product iodine number [2] | 194 | 187 | 188 | 177 | 188 |
| Yield,[3] per cent | 77 | 86 | 88 | 83 | 85 |

[1] ASTM, 2% solution.
[2] After the Attapulgus clay had treated 15 barrels of polymer per ton.
[3] Weight per cent of product, based on reduced clay polymer charging stock.

*Example VIII*

A clay polymer having properties as hereinafter set forth was dissolved in an equal volume of hexane, and the solution was heated on a steam bath to approximately 140° F. Four percent by weight of powdered anhydrous aluminum chloride, based on the clay polymer, was then slowly added to the warm solution with continuous stirring. Agitation was continued at 140° F. for thirty minutes, and the mixture was then allowed to cool to room temperature. From the cooled mixture was separated 14.2 percent by weight, based on the clay polymer, of a heavy, black, tarry sludge, including aluminum chloride. Sufficient isopentane was then added to the hexane solution to give a mixture having a ratio of about two volumes of mixed isopentane and hexane per volume of clay polymer, and the solution was passed through a column of dry Florex clay at the rate of four barrels of clay polymer per ton of clay per hour. The effluent stream from the column was collected and freed of solvent by stripping under vacuum. The yield of product was 74%, based on the weight of clay polymer charged. The properties of the charging stock and product are compared in the following table:

|  | Charging Stock | Product | | |
| --- | --- | --- | --- | --- |
|  |  | Initial Effluent | Final Effluent [1] | Composite |
| ASTM color, 2% solution | [2] Black | 1.25 | 3 |  |
| Iodine number | 193 |  |  | 164 |
| Viscosity, 100° F., SSU | 346 | 116 | 165 |  |
| Specific gravity | 0.967 |  |  | 0.927 |

[1] After the Florex clay had treated 15 barrels of polymer per ton.
[2] 7½ ASTM in 0.5% solution in hexane.

The above examples are illustrations only of various forms that our invention may take, and it is to be understood that we do not wish to be limited thereby. For example, we may choose to use a multiple-step treatment of clay polymers with acidic polymerization catalysts, and subsequently with adsorbent solids. In general, it may be said that any modifications or equivalents that would ordinarily occur to one skilled in the art are to be considered as lying within the scope of our invention.

The products of our invention are clear, amber to light-red liquids having iodine numbers that are in excess of 150 and may be as high as 250 or above, average molecular weights between about 200 and 400, drying times less than that of linseed oil, and viscosities that may be varied at will over a wide range by regulating the conditions under which the products are made. The products obtained from the preferred form of our invention have ASTM colors (undiluted) of 5 or below. These materials have proved to have considerable utility in the formulation of air-drying and baking varnishes, as modifying resins in alkyd compositions, and as cold-cut resins in linseed oil base paints.

In accordance with the foregoing specification, we claim as our invention:

A process for preparing a drying oil of superior quality from clay polymer, which comprises distilling crude clay polymer and separating therefrom a reduced clay polymer having a viscosity between about 200 and 1000 SSU at 210° F., fractionally distilling said clay polymer at an absolute pressure between about 5 and 10 mm. Hg and separating therefrom a drying oil as a distillate fraction and a drying resin as a bottoms fraction having a softening point between about 150 and 300° F. (ring and ball test), dissolving said drying-oil distillate fraction in a petroleum naphtha in a distillate-to-naphtha ratio between about 0.25:1 and 4:1, contacting the resulting solution with between about 5 and 15 percent by weight, based on said drying-oil distillate fraction, of sulfuric acid having a concentration between about 90 and 100 percent for a period between about 0.5 and 10 minutes at a temperature between about 30 and 200° F., thereby polymerizing color bodies originally present in said drying-oil distillate fraction while reducing the iodine number of said fraction between about 5 and 20 percent, withdrawing an acid sludge containing the resulting polymerized color bodies, contacting the treated solution with an active clay, separating said petroleum naphtha from the resulting clay-treated solution, and recovering a drying oil having an ASTM color below about 5 therefrom.

LEON M. ADAMS.
PRESTON L. BRANDT.
ROBERT J. LEE.
FRANCIS T. WADSWORTH.

REFERENCES CITED

The following references are of record in the file of this patent:

UNITED STATES PATENTS

| Number | Name | Date |
| --- | --- | --- |
| 1,919,722 | Hyman | July 25, 1933 |
| 2,090,333 | Osterstrom | Aug. 17, 1937 |
| 2,092,889 | Mikeska | Sept. 14, 1937 |
| 2,228,789 | Soday | Jan. 14, 1941 |
| 2,240,081 | Thomas | Apr. 29, 1941 |
| 2,257,078 | Soday | Sept. 23, 1941 |

FOREIGN PATENTS

| Number | Country | Date |
| --- | --- | --- |
| 397,699 | Great Britain | Aug. 31, 1933 |
| 835,014 | France | Dec. 9, 1938 |